(12) United States Patent
Karlson

(10) Patent No.: US 6,248,880 B1
(45) Date of Patent: Jun. 19, 2001

(54) NONIONIC CELLULOSE ETHER WITH IMPROVE THICKENING PROPERTIES

(75) Inventor: Leif Karlson, Stenungsund (SE)

(73) Assignee: Akzo Nobel NV (NL)

( * ) Notice: Subject to any disclaimer, the term of this patent is extended or adjusted under 35 U.S.C. 154(b) by 0 days.

(21) Appl. No.: 09/356,624

(22) Filed: Jul. 19, 1999

Related U.S. Application Data
(60) Provisional application No. 60/097,597, filed on Aug. 24, 1998.

(30) Foreign Application Priority Data

Aug. 6, 1998 (SE) .................................................. 9802676

(51) Int. Cl.$^7$ .................................................. C08B 11/193
(52) U.S. Cl. ................................. 536/91; 536/90; 536/95; 536/96
(58) Field of Search ................................. 536/90, 91, 95, 536/96

(56) References Cited

U.S. PATENT DOCUMENTS 4,228,277   10/1980   Landoll .................................. 536/90
5,140,099 * 8/1992   Bostrom et al. ........................ 536/91

FOREIGN PATENT DOCUMENTS 0 390 240 A1   10/1990 (EP) ........................... C08B/11/193
0 390 240 B1   10/1990 (EP) ........................... C08B/11/193

* cited by examiner

Primary Examiner—James J. Seidleck
Assistant Examiner—U. K. Rajguru
(74) Attorney, Agent, or Firm—Ralph J. Mancini

(57) ABSTRACT

The present invention relates to associative cellulose ethers with improved thickening effects, especially in paint. The improvement depends on the presence of a hydrophobic modifying group of the general formula

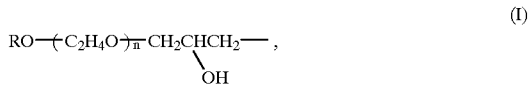

where R is an aliphatic group of 12–22 carbon atoms and n is a number from 3 to 7. The DS of the hydrophobic group is 0.003 to 0.012.

8 Claims, No Drawings

NONIONIC CELLULOSE ETHER WITH IMPROVE THICKENING PROPERTIES

The present case claims priority of Swedish application No. 9802676-8 filed on Aug. 6, 1998 and of U.S. provisional application serial No. 60/097,597 filed Aug. 24, 1998.

FIELD OF THE INVENTION

This invention relates to new nonionic cellulose ethers with improved thickening effects, especially in paint compositions. The improvements depend on the presence of hydrophobic substituents having a poly(oxyethylene) spacer between a large aliphatic group and the linkage to the cellulose ether.

BACKGROUND OF THE INVENTION

U.S. Pat. No. 4,228,277 discloses associative water-soluble nonionic cellulose ethers of the so called associative type. They contain as a modifying substituent a $C_{10}$ to $C_{24}$ long chain alkyl group which may be introduced by reacting a water-soluble cellulose ether and a suitable amount of the corresponding $C_{10}$ to $C_{24}$ epoxide.

In EP-A-390 240 associative nonionic cellulose ethers are described which may contain hydrophobic substituents of the formula

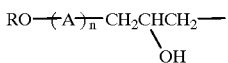

where R is a hydrophobic group containing 8–36 carbon atoms, A is an alkylenoxy group having 2–3 carbon atoms and n is a number from 0 to 6. In Example F the publication discloses an ethyl hydroxyethyl cellulose ether containing the hydrophobic substituent

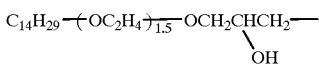

The degree of substitution of this group is 0.016.

It has now been found that the properties of the prior art nonionic cellulose ethers can be improved by the present nonionic cellulose ethers which have improved thickening effects, especially in paint compositions.

SUMMARY OF THE INVENTION

The present invention generally relates to nonionic cellulose ethers having improved thickening effects compared to the prior art. The improvements depend on the presence of hydrophobic substituents having a poly(oxyethylene) spacer between a large aliphatic group and the linkage to the cellulose ether. The invention also relates to a thickener which comprises the nonionic cellulose ethers of the present invention.

DETAILED DESCRIPTION OF THE INVENTION

The present invention generally relates to nonionic cellulose ethers having improved thickening effects compared to the prior art. The properties of the present nonionic cellulose ethers are improved by introducing into the nonionic cellulose ether a hydrophobic modifying group of the general formula

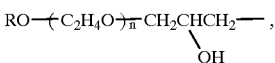

where R is an aliphatic group of 12–22 carbon atoms and n is a number from 3 to 7 with a degree of substitution of 0.003–0.102.

The hydrophobically modified cellulose ether may have a viscosity of 20–15000 mPa.s, preferably 100–12000 mPa.s, and more preferably 150–4000 mPa.s, measured in a 1% by weight water solution with a StressTech rheometer from Rheologica, equipped with a 4 cm 1° cone and plate system, at 20° C.+ or −0.1° C. The rheometer was put in the constant shear mode and all viscosities were measured at the Newtonian plateau, characterized by a shear rate independent viscosity.

Extensive studies have shown that the length of the spacer, that is to say the length of the hydrophilic group $(-C_2H_4O-)_n$ positively affects the thickening, levelling and high shear viscosity in paint compositions. For example, the contribution of the thickening effect of the group

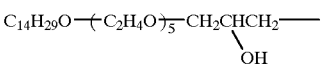

is higher than the effect of the group

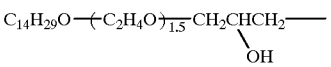

Very surprising is also the fact that the thickening effect of the long spacer is more pronounced the larger the aliphatic group is. Preferably R is an aliphatic group of 14–20 carbon atoms and n is a number from 3 to 5. Even if larger aliphatic groups and higher values of n will further improve the viscosity, such high viscosities will normally not be required.

Besides the hydrophobic group the cellulose ether may contain lower alkyl substituents such as methyl, ethyl or propyl, or hydroxyalkyl substituents as hydroxyethyl, hydroxypropyl or hydroxybutyl or combinations thereof. The substituent and the degree of substitution are chosen so that the associative cellulose ethers of the invention become water-soluble or water-dispersable.

It has also been found that cellulose ethers, substituted with a group of the formula I and having a low degree of polymerisation, have remarkably favourable properties. These cellulose ethers have a unique combination of high associative thickening effect, high hydrophilicity and comparatively low thickening effect depending on the length of the cellulose chain. The unique combination of properties depends on the fact that the hydrophilicity of the large spacer of the group I increases the hydrophilicity of the cellulose ether and at the same time the associative thickening effect of the group I. The unique properties of these cellulose ethers can for example be utilized to improve the levelling, sagging and spatter of paint compositions.

The differences in DP between cellulose ethers may easily be measured by determining the DP viscosity in a blend of diethylene glycol monobutylether and water in a weight ratio of 20:80. In such a blend all hydrophobic associations are broken and the viscosity depends on the length of the cellulose chain. In this context the DP viscosity means the viscosity of 1% by weight of cellulose ether dissolved in the blend divided by 2.7. The DP viscosity value indicates an average DP value of the cellulose ether. According to the invention the cellulose ethers normally have a DP viscosity of 15–200 mPa.s. In paint compositions the DP viscosity of the cellulose ethers are preferably 20–100 mPa.s.

The cellulose ethers of the invention may be prepared by using known process steps. For example an alkali cellulose and suitable reactants can be reacted in the presence of an alkaline catalyst in order to introduce low alkyl groups and/or hydroxyalkyl groups in such amounts that the intermediate cellulose ethers obtained are water soluble. This intermediate cellulose ether product and a reactant having the formula

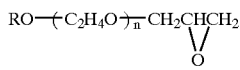

in which R and n have the meaning mentioned above, at elevated temperature and in the presence of an alkaline catalyst, to form a cellulose ether according to the invention.

Suitable water-soluble ethers to which the hydrophobic group is added include, but are not limited to alkyl cellulose, alkyl hydroxyalkyl cellulose and hydroxyalkyl cellulose. Specific examples of such cellulose ethers include methyl hydroxyethyl cellulose, methyl hydroxypropyl cellulose, hydroxyethyl cellulose, methyl cellulose, hydroxyethyl hydroxypropyl cellulose, ethyl hydroxyethyl cellulose, methyl ethyl hydroxyethyl cellulose and methyl hydroxyethyl hydroxypropyl cellulose. Preferred cellulose ethers are alkyl hydroxyalkyl celluloses, such as methyl hydroxyethyl cellulose, methyl ethyl hydroxyethyl cellulose and ethyl hydroxyethyl cellulose; and hydroxyethyl cellulose.

The hydrophobically modified cellulose ethers of the invention may advantageously be used as a colloid stabilizer, thickener or reology modifier. Typical application areas are aqueous paint formulations, such as latex paints; cosmetics, such as shampoos and conditioners; detergent compositions, such as surface cleaners and compositions for laundry; and paper coating compositions.

The cellulose ethers may advantageously be used in water-based flat, semi-flat and semi-gloss paints. The amounts added of the cellulose ethers vary depending on both the composition of the paints and the substitution and viscosity of the cellulose ethers, but normally the addition is 0.2–1% by weight of the paints. Suitable binders are emulsion binders, such as alkyd resins, and latex binders, such as polyvinyl acetate, copolymers of vinyl acetate and acrylate, copolymers of vinyl acetate and ethylene, copolymers of vinyl acetate, ethylene and vinyl chloride and copolymers of styrene and acrylate. The latex binders are often stabilized with anionic surfactants.

The present cellulose ethers are much more versatile thickeners than earlier known associative nonionic cellulose ethers. The paint formulator has the possibility to affect the final paint properties to a very high extent. The present cellulose ethers can be used in all types of paints ranging from low to high PVC, and for interior as well as exterior use. They contribute to the following paint properties:

low spatter good film build good flow and levelling low sag

The present invention and the advantages of the present cellulose ethers are further illustrated by the following examples.

EXAMPLE A

One mole of tetradecanol ethoxylated with 2 moles of ethylene oxide per mole of tetradecanol and one mole of epichlorohydrin were reacted in the presence of tin tetrachloride at a temperature of 60 to 70° C. and a glycidyl ether was obtained. A solution of 30% sodium hydroxide in water was added at 80° C. After 30 minutes under vigorous stirring at 80° C., the resulting glycidyl ether was separated from the water phase. It had the structure

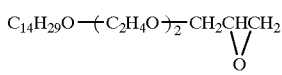

Powder of dissolving wood pulp was added to a reactor. After evacuation of the air, 0.7 g of sodium hydroxide (50% w/w in water) were first added per gram of wood pulp followed by addition of 0.84 g of ethylene oxide, 1.5 g of ethyl chloride and 0.040 g of the glycidyl ether calculated on one gram of wood pulp. After the additions the temperature in the reactor was increased to 55° C. and held there for 50 minutes. The temperature was then increased to 105° C. and maintained for 50 minutes. The cellulose ether obtained was washed with boiling water and neutralised with acetic acid. The cellulose ether had a $MS_{hydroxyethyl}=2.1$, a $DS_{ethyl}=0.8$, and a $DS_R=0.008$, where R is the group

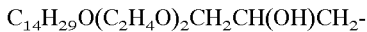

EXAMPLE B

Example A was repeated but the tetradecanol ethoxylate had 5 moles of ethylene oxide per mole of tetradecanol. The tetradecanol ethoxylate and epichlorohydrin were reacted and a glycidyl ether of the formula

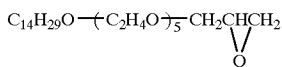

was obtained. In the production of the cellulose ether the amount of glycidyl ether was 0.055 g per g of wood pulp. The cellulose ether obtained had a $MS_{hydroxyethyl}=2.1$, a $DS_{ethyl}=0.8$, and a $DS_R=0.007$, where R is the group

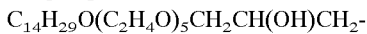

EXAMPLE C

Example A was repeated, but a hexadecanol ethoxylate with 2 moles of ethylene oxide per mole of hexadecanol was used instead of the tetradecanol ethoxylate. The hexadecanol ethoxylate and epichlorohydrin were reacted and a glycidyl ether of the formula

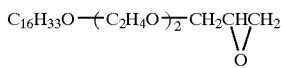

was obtained. In the production of the cellulose ether the amount of glycidyl ether was 0.042 g per g of wood pulp. The cellulose ether obtained had a $MS_{hydroxyethyl}=2.1$, a $DS_{ethyl}=0.8$, and a $DS_R=0.008$, where R is the group

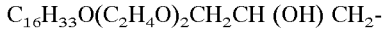

EXAMPLE D

Example B was repeated but hexadecanol ethoxylate with 5 moles of ethylene oxide per mole of hexadecanol was used instead of the tetradecanol ethoxylate. The hexadecanol ethoxylate and epichlorohydrin were reacted and a glycidyl ether of the formula $$C_{16}H_{33}O\text{---}(C_2H_4O)_{5}\text{---}CH_2\underset{O}{\underset{\diagdown\!/}{CHCH_2}}$$

was obtained. In the production of the cellulose ether the amount of glycidyl ether was 0.058 g per g of wood pulp. The cellulose ether obtained had a $MS_{hydroxyethyl}=2.1$, a $DS_{ethyl}=0.8$, and a $DS_R=0.008$, where R is the group $C_{16}H_{33}O(C_2H_4O)_5CH_2CH(OH)CH_2\text{-}$

EXAMPLE E

Example A was repeated but an oleylalcohol ethoxylate with 2 moles of ethylene oxide per mole of oleylalcohol was used instead of the tetradecanol ethoxylate. The oleylalcohol ethoxylate and epichlorohydrin were reacted and a glycidyl ether of the formula $$CH_3\text{---}(CH_2)_7\text{---}CH\text{=}CH\text{---}(CH_2)_8\text{---}O\text{---}(C_2H_4O)_{2}\text{---}CH_2\underset{O}{\underset{\diagdown\!/}{CHCH_2}}$$

was obtained. In the production of the cellulose ether the amount of glycidyl ether was 0.053 g per g of wood pulp. The cellulose ether obtained had a $MS_{hydroxyethyl}=2.11$ a $DS_{ethyl}=0.08$, and a $DS_R=0.008$, where R is the group $CH_3(CH_2)_7CH\text{=}CH(CH_2)_8O(C_2H_4O)_2CH_2CH(OH)CH_2\text{-}$

EXAMPLE F

Example B was repeated but an oleylalcohol ethoxylate with 5 moles of ethylene oxide per mole of oleylalcohol was used instead of the tetradecanol ethoxylate. The oleylalcohol ethoxylate and epichlorohydrin were reacted and a glycidyl ether of the formula $$CH_3\text{---}(CH_2)_7\text{---}CH\text{=}CH\text{---}(CH_2)_8\text{---}O\text{---}(C_2H_4O)_{5}\text{---}CH_2\underset{O}{\underset{\diagdown\!/}{CHCH_2}}$$

was obtained. In the production of the cellulose ether the amount of glycidyl ether was 0.065 g per g of wood pulp. The cellulose ether obtained had a $MS_{hydroxyethyl}=2.1$, a $DS_{ethyl}=0.8$, and a $DS_R=0.008$, where R is the group $CH_3(CH_2)_7CH\text{=}CH(CH_2)_8O(C_2H_4O)_5CH_2CH(OH)CH_2\text{-}$

EXAMPLE G

Example B was repeated but an adduct mixture of 2-octyldecanol, 2-hexyldodecanol, 2-octyldodecanol, 2-hexyldecanol and 2 moles of ethylene oxide per mole of the alcohol mixture was used instead of the tetradecanol ethoxylate. The adduct mixture and epichlorohydrin were reacted and a glycidyl ether of the formula $$C_pH_{2p+1}(C_mH_{2m+1})CHCH_2O\text{---}(C_2H_4O)_{2}\text{---}CH_2\underset{O}{\underset{\diagdown\!/}{CHCH_2}},$$

where p is 6–8 and m is 8–10 was obtained. In the production of the cellulose ether the amount of glycidyl ether was 0.047 g per g of wood pulp. The cellulose ether obtained had a $MS_{hydroxyethyl}=2.1$, a $DS_{ethyl}=0.8$ and a $DS_R=0.006$, where R is the group $$C_pH_{2p+1}(C_mH_{2m+1})CHCH_2O\text{---}(C_2H_4O)_{2}\text{---}CH_2\underset{O}{\underset{\diagdown\!/}{CHCH_2}},$$

where p and m have meanings mentioned above.

EXAMPLE H

Example B was repeated but an adduct mixture of 2-octyldecanol, 2-hexyldodecanol, 2-octyldodecanol, 2-hexyldecanol and 5 moles of ethylene oxide per mole of the alcohol mixture was used instead of the tetradecanol ethoxylate. The adduct mixture and epichlorohydrin were reacted and a glycidyl ether of the formula $$C_pH_{2p+1}(C_mH_{2m+1})CHCH_2\text{---}(C_2H_4O)_{5}\text{---}CH_2\underset{O}{\underset{\diagdown\!/}{CHCH_2}},$$

where p is 6–8 and m is 8–10 was obtained. In the production of the cellulose ether the amount of glycidyl ether was 0.065 g per g of wood pulp. The cellulose ether obtained had a $MS_{hydroxyethyl}=2.1$, a $DS_{ethyl}=0.8$, and a $DS_R=0.004$, where R is the group $C_pH_{2p+1}(C_mH_{2m+1})CHCH_2O(C_2H_4O)_5CH_2(OH)CH_2\text{-}$, where p and m have meanings mentioned above.

EXAMPLE I

Example A was repeated but tetradecanol and epichlorohydrin were directly reacted and a glycidyl ether of the formula $$C_{14}H_{29}OCH_2\underset{O}{\underset{\diagdown\!/}{CHCH_2}}$$

was obtained. In the production of the cellulose ether the amount of the glycidyl ether was 0.029 g per g of wood pulp. The cellulose ether obtained had a $MS_{hydroxyethyl}=2.1$, a $DS_{ethyl}=0.8$, and a $DS_R=0.09$, where R is the group $C_{14}H_{19}OCH_2CH(OH)CH_2$

EXAMPLE 1

A cellulose ether solution containing 1% by weight of any one of the cellulose ethers in Examples A–I in deionised and distilled water were prepared. The viscosities of the solutions were measured with a StressTech rheometer from Rheologica equipped with a 4 cm 1° cone and plate system at 20° C.+ or −0.1° C. rheometer was put in the constant shear mode and all the viscosities were measured at the Newtonian plateau, characterized by the shear rate independent viscosity. The following results were obtained.

| | Cellulose ether | | | | Viscosity | DP Viscosity |
|---|---|---|---|---|---|---|
| Test No | Example | Alipatic group | n | $DS_R$ | mPa · s | mPa · s |
| 1 | A | $C_{14}H_{29}$— | 2 | 0.008 | 1660 | 47 |
| 2 | B | $C_{14}H_{29}$— | 5 | 0.007 | 2851 | 52 |

-continued

| Test No | Example | Cellulose ether Alipatic group | n | $DS_R$ | Viscosity mPa·s | DP Viscosity mPa·s |
|---|---|---|---|---|---|---|
| 3 | C | $C_{16}H_{33}$— | 2 | 0.008 | 561 | 55 |
| 4 | D | $C_{16}H_{33}$— | 5 | 0.008 | 721 | 54 |
| 5 | E | Oleyl | 2 | 0.008 | 3172 | 54 |
| 6 | F | Oleyl | 5 | 0.008 | 4415 | 54 |
| 7 | G | (1) | 2 | 0.006 | 2333 | 41 |
| 8 | H | (1) | 5 | 0.004 | 2565 | 46 |
| 9 | I | $C_{14}H_{29}$— | 0 | 0.009 | 1300 | 92 |

(1) = $C_pH_{2p+1}(C_mH_{2m+1})CHCH_2$—, where p is 6–8 and m is 8–10.

From the results it is evident that the thickening efficiency of the cellulose ethers increases with the length of the spacers. The low viscosities of the water solution of the cellulose ethers C and D depend on the fact that phase separation occurs at 20° C.

EXAMPLE 2

Semi-gloss latex paints were prepared and one of the cellulose ethers in examples A–I was added in such an amount that a latex paint of a Stormer viscosity of 110 KU was obtained. The latex paints had the following composition.

| Ingredient | Parts by weight |
|---|---|
| Water | 243.5 - x |
| Cellulose ether | x |
| Bactericide | 1 |
| Dispersing agent | 6.5 |
| Defoamer | 5 |
| Titanium dioxide | 180 |
| Calcium carbonate | 110 |
| Latex (Vinamul 3650) | 454 |

The amounts of cellulose ether needed to obtain a Stormer viscosity of 110 were as follows.

| Test No | Cellulose ether Example | Spacer n | Amount parts by weight |
|---|---|---|---|
| 10 | A | 2 | 4.0 |
| 11 | B | 5 | 3.5 |
| 12 | C | 2 | 4.1 |
| 13 | D | 5 | 3.7 |
| 14 | E | 2 | 3.0 |
| 15 | F | 5 | 2.8 |
| 16 | G | 2 | 4.0 |
| 17 | H | 5 | 3.5 |
| 18 | I | 0 | 4.0 |

From the results it is evident that the cellulose ethers with the longer ethylene oxide spacer (Tests 11, 13, 15 and 17) give a latex paint with a Stormer viscosity of 110 KU at a lower amount of addition than the cellulose ethers with shorter spacers. In the paint formulation the cellulose ethers of Examples C and D do not cause any phase separations.

We claim:

1. A nonionic associative cellulose ether comprising a modifying hydrophobic group of the formula

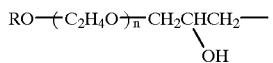

wherein R is an aliphatic group of 12–22 carbon atoms and n is a number from 3 to 7, with a degree of substitution of 0.003 to 0.012.

2. The cellulose ether of claim 1 wherein having a viscosity of 20–15000 mPa.s in a 1% water solution at 20° C.

3. The cellulose ether of claim 1 having a DP viscosity of 15–200 mPa.s.

4. The cellulose ether of claim 3 having a degree of substitution of from 0.003 to 0.012.

5. The cellulose ether of claim 1 wherein the cellulose ether is a modified water-soluble alkyl cellulose, hydroxyalkyl cellulose or alkyl hydroxyalkyl cellulose.

6. The cellulose ether of claim 5 wherein the cellulose ether is a modified methyl hydroxyethyl cellulose, ethyl hydroxyethyl cellulose, methyl ethyl hydroxyethyl cellulose, or hydroxyethyl cellulose.

7. The cellulose ether of claim 1 having a DP viscosity of 20–100 mPa.s.

8. The cellulose ether of claim 1 having a viscosity of 100–12000 mpa.s measured in 1% water solution at 20° C.

* * * * *